United States Patent [19]

Ible

[11] 4,300,878
[45] Nov. 17, 1981

[54] EXTRUSION DIE FOR FORMING COMPOSITE RUBBER-CORD STRIP

[75] Inventor: Donald G. Ible, Akron, Ohio

[73] Assignee: The Firestone Tire & Rubber Company, Akron, Ohio

[21] Appl. No.: 181,588

[22] Filed: Aug. 27, 1980

[51] Int. Cl.³ .............................................. B29F 3/10
[52] U.S. Cl. ................................... 425/114; 264/174; 425/131.1; 425/133.5; 425/461; 425/467
[58] Field of Search ............... 425/114, 113, 461, 467, 425/131.1, 133.5, 131.5; 264/172, 108, 174

[56] References Cited

U.S. PATENT DOCUMENTS

| | | | |
|---|---|---|---|
| 2,401,551 | 6/1946 | Cook, Jr. | 425/113 |
| 2,453,312 | 9/1948 | Frazier | 425/114 |
| 2,468,585 | 4/1949 | Bluma | 264/177 R |
| 3,070,841 | 1/1963 | Schornstheimer | 425/461 |
| 3,280,427 | 10/1966 | Smith | 425/131.1 |
| 3,487,505 | 1/1970 | Chisholm et al. | 425/133.5 |
| 3,616,496 | 11/1971 | Anglioletti et al. | 425/113 |
| 3,874,837 | 4/1975 | Jamieson | 425/461 |
| 3,994,654 | 11/1976 | Chyu | 425/461 |
| 4,050,867 | 9/1977 | Ferrentino et al. | 264/174 |
| 4,165,957 | 8/1979 | Kertscher | 264/174 |

Primary Examiner—Jeffery R. Thurlow

[57] ABSTRACT

A die structure for forming a composite rubber-cord strip is provided having a die throat whose aperture width at entry is greater than at exit, while its height at entry is smaller than at exit, thus providing a substantially constant cross-sectional area of the throat throughout; rubber is supplied to the entry along a path parallel to the cords, and from a cord guide whose hole spacing is greater than the cord spacing in the ply at the die exit.

8 Claims, 5 Drawing Figures

EXTRUSION DIE FOR FORMING COMPOSITE RUBBER-CORD STRIP

FIELD OF THE INVENTION

In the production of cord-reinforced elastomer strips for the construction of vehicle tires, it is common practice to pass cords, such as wire-cords, in parallelism through a guide and thereupon to extrude rubber around the wires.

Uniformity of rubberization and the maintenance of accurate cord-spacing in the strip or ply are two important requirements of such ply production, the edges of the ply being most sensitive to variation. Fluctuations occuring in extruding pressure and/or in rubber viscosity may lead to poor flow in the rubber.

PRIOR ART

The extrusion of material through a progressively narrowing orifice is shown by Chuy in U.S. Pat. No. 3,994,654; also pressing, or forcing, extrudable material around or onto a strand or filament by means of a narrowing die-passage, is shown, for example by Cook in U.S. Pat. No. 2,401,551, and by Kertscher in U.S. Pat. No. 4,165,957, both of whom employ a compression cone whose diameter narrows progressively; in U.S. Pat. No. 4,050,867, Ferrentino et al similarly disclose a progressively narrowing die, whose wall contour decreases from a conical portion to a parallel portion.

However, none of the above devices recognize the need, nor disclose or suggest a means, for improving the uniformity of cord-spacing and elastomer-flow in a composite strip.

It has been suggested to improve uniformity and accuracy at the ply edge by guiding the rubber laterally inwardly into a side-flow, to 'pack' the edges of the ply as the cords leave the wire-guide. This, however, tends to cause stock turbulence and attendant cord-deflection.

In addition to the ply edge situation, the problem exists of providing a die system which will produce a rubberized strip in which the cord spacing is very close; i.e., how to manufacture a wire-guide having closely spaced holes sufficiently large to allow the wires to pass, while maintaining sufficient metal wall thickness between the holes. One solution advanced has been to drill alternate wire-guide holes in two rows, each angling toward the same exit plane. In this manner, wall thickness between adjacent wire holes would be increased. It has been found, however, that this results in pairing, a condition in which the cords are caused to arrange themselves into pairs, with alternating narrow and wide spacings across the rubberized ply.

Consistency in strip width and, cord-spacing are important, and were not obtainable by the above approaches.

It is thus an object of the invention to provide die-apparatus for producing a strip or ply of rubberized cords, wherein improved close cord spacing uniformity is maintained, with reduced tendency for strip-width variation due to fluctuations in extruder head pressure or rubber consistency.

SUMMARY OF THE INVENTION

The present invention comprises a die-structure providing a pre-channeled rubber-flow into an aperture whose sidewalls converge toward the die-exit, while its height increases, to present a substantially constant cross-sectional area throughout; and a cord-guide whose hole-spacing at the die entry is greater than the cord-spacing required in the ply at the die-exit.

DESCRIPTION OF THE DRAWINGS

FIG. 3 is a longitudinal cross-sectional view of the assembled die-structure of FIG. 4, with the guide disposed in a housing of the extrusion nozzle.

DESCRIPTION OF A PREFERRED EMBODIMENT

Figure 1:
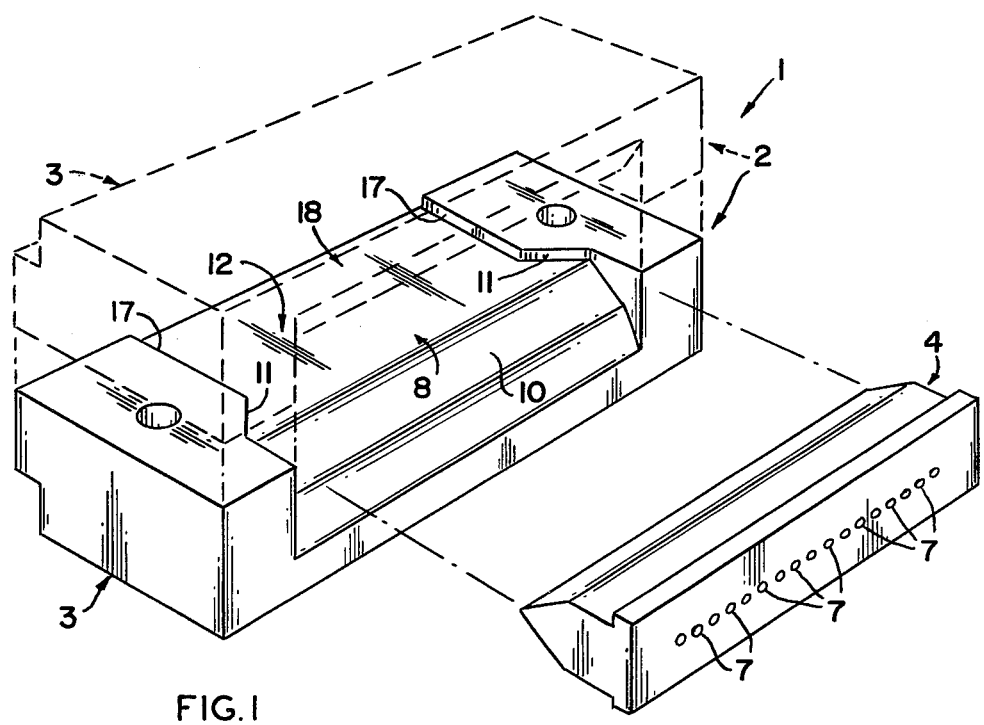
FIG. 1 is a perspective view, partially exploded and in phantom, showing a portion of a prior art die-structure.
Figure 2:
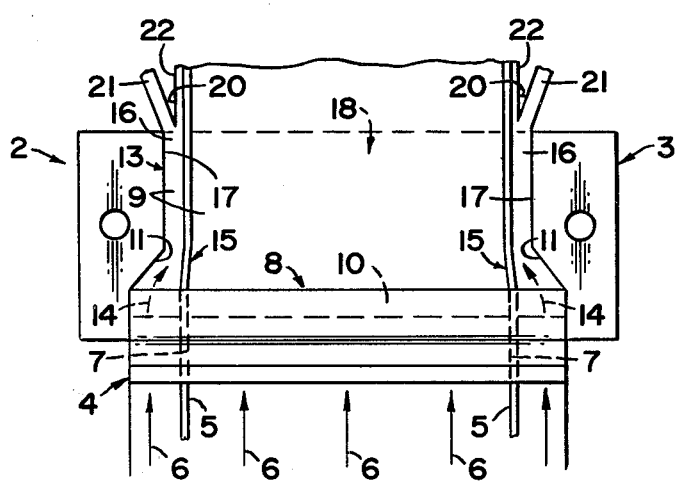
FIG. 2 is a top view of the die-structure of FIG. 1, in use.

FIG. 1 and FIG. 2 show respectively, a prior art die-structure, exploded, and its operation. In FIG. 1, a die-structure is generally indicated at 1, and comprises a die-throat 2 made up of two opposed, matching halves 3 fastened together; and a wire-cord guide insert 4. The portions 3 of the die-throat 2 and insert 4 are associated as shown in FIG. 2, and similarly to that seen in the cross-section in FIG. 5.

Parallel wires 5, only two of which are shown for clarity in FIG. 2, are advanced by means not shown in the direction of arrows 6 through openings 7 in the insert 4 and thereafter into and through the aperture of the die-throat 2, where the receive rubberization from an extruder, well known and not shown. For the sake of simplicity, and opposing halves of the die-throat being similar construction, the ensuing description will proceed on the basis of one die throat half 3. The parallel wires 5 leave insert 4, and enter the die-throat entry 8; simultaneously, rubber 9 from the extruder enters through the full-width channel formed between the insert 4 and the ramp 10, and is forced around and between the wires 5. As the rubber flows up the ramp 10 and into the entry 8 together with the wires 5, the converging walls 11 of the entry 8 of the aperture 12 within which the composite strip 13 is formed induces a significant side-flow 14 in the rubber. Such side-flow, with its substantial transverse component, tends to cause deflection of the wires 5 as shown at 15, as well as turbulence in the stock resulting in poor strip edges at 16.

Beyond the converging walls 11, the aperture 12 exhibits walls 17 parallel to each other and generally parallel to the wires 5. The entire aperture 12, from entry 8 to exit 18, has a substantially constant vertical dimension, being twice the height of walls 11 and 17.

As the strip exits, trimming means 20, such as knives or wires sever the trim 21 from the strip sides, leaving a final edge 22. But the results of the induced tapering flow 14 remain, resulting in an inacceptable product.

Figure 3:
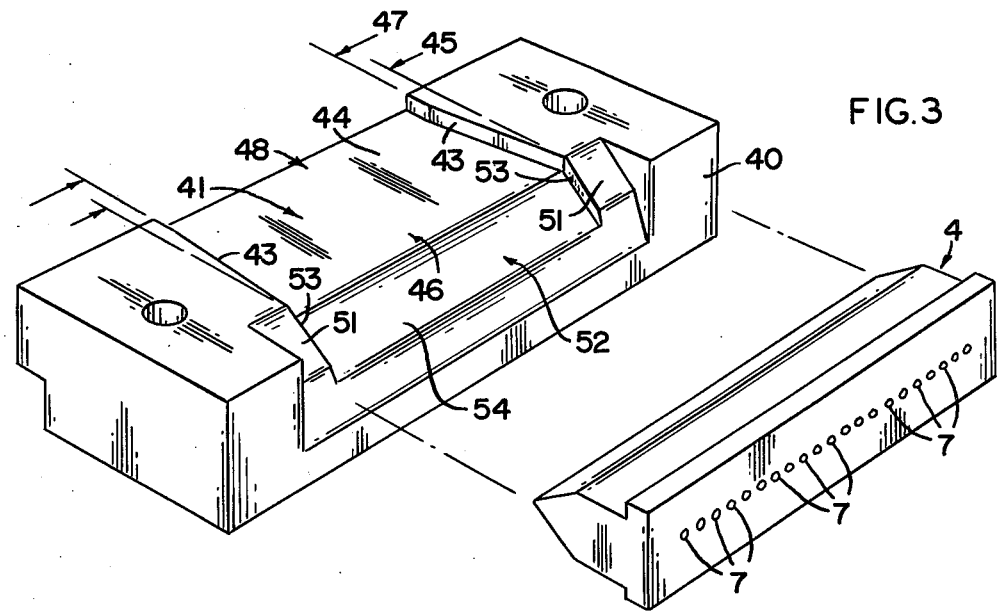
FIG. 3 is a perspective view, partially exploded, showing a portion of the die-structure of the invention.
Figure 4:
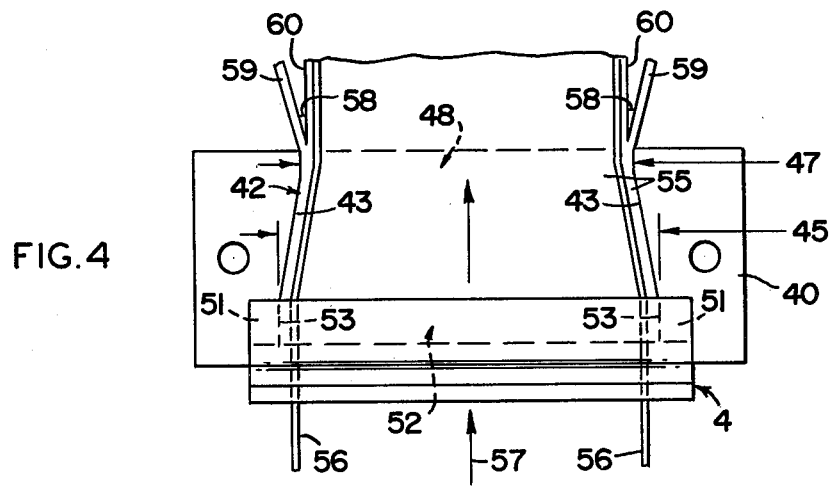
FIG. 4 is a top view of the die structure of FIG. 3, in use.
Figure 5:
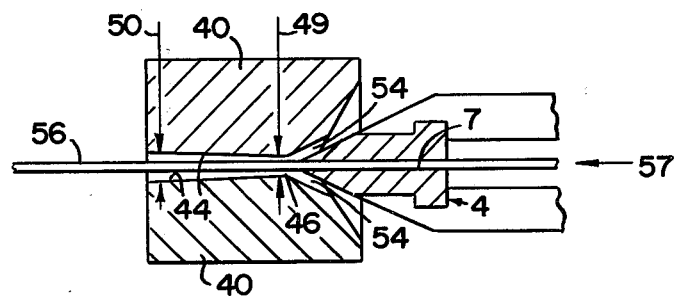

Turning now to FIGS. 3, 4 and 5, the die-structure of the invention comprises a cord-guide 4; and a die-throat of which only the lower half 40 is shown. According to invention, an aperture 41 for forming the composite rubber-cord strip 42 is bounded by opposing sidewalls 43 and opposing upper and lower walls 44, respectively.

The opposing sidewalls 43 converge longitudinally of the aperture 41 from a width 45 at the entry 46 to a width 47 at the exit 48. Simultaneously, the opposing upper and lower walls 44 diverge longitudinally of the aperture 41 from a height 49 at the entry 46 to a height 50 at the exit 48.

In this manner, while the cross-section of the aperture 41 at any point between entry and exit is a generally rectangular parallelogram whose major dimension remains in the same plane, the converging width, concurrent with the diverging height, of the aperture is selected such that the cross-sectional area of the aperture 41 remains substantially constant throughout, from entry to exit.

Ahead of the entry 46, the die-throat 40 is provided with laterally spaced ramp-portions 51, which are separated by a recess 52. The sidewalls 53 of the recess lead to the entry 46 and the lateral spacing between them equals the width of the entry. The ramps 51 are adapted to engage the lateral end portions of the insert 4. With the insert in place on the ramps 51, there is thus formed a pre-shaping channel 54 which constitutes the single avenue for extrusion rubber 55 to flow to the entry 46 to be joined with cords 56. Thus, in advance of its arrival in the entry 46 the rubber flow is channeled by the parallel walls 53 of channel 54 into a flow generally parallel to the direction 57 of the advancing cords 56.

From FIG. 4 it will be seen most clearly that, with the present invention, it is possible now to space the wire-holes 7 in the guide 4 an amount sufficient to allow adequate metal-wall gauge, to bring rubber along a parallel path and into engagement with the cords 56, and thereafter to narrow the entire composite strip while increasing its gauge toward the exit, thus actually drawing down the composite to the specified width. The usual trimming devices 58 sever a trim 59, leaving a finished edge 60.

What is claimed is:

1. In an extrusion die-throat having a composite-forming aperture with an entry for advancing parallel cords and elastomer and an exit for the composite, the improvement comprising
    a first pair of opposed aperture sidewalls converging from entry to exit; and
    a second pair of opposed upper and lower aperture walls diverging from entry to exit;
    said pairs of walls forming cross-sectional areas which remain substantially constant, and whose major dimensions remain in the same plane, from entry to exit.

2. In an extrusion die-throat having a composite-forming aperture with an entry for advancing parallel cords and elastomer and an exit for the composite, the improvement comprising
    a first pair of opposed aperture sidewalls converging from entry to exit;
    a second pair of opposed upper and lower aperture walls diverging from entry to exit;
    laterally spaced ramp-pairs adjacent the entry; and
    converging channels recessed between the ramps of each said pair.

3. In an extrusion die-structure having a die-throat with a composite-forming aperture having an entry for advancing parallel cords and elastomer and an exit for the composite, the improvement comprising
    a first pair of opposed aperture sidewalls converging from entry to exit;
    a second pair of opposed upper and lower aperture walls diverging from entry to exit;
    laterally spaced ramp-pairs converning upon the entry;
    a cord guide engaging said ramp-pairs; and
    a recess between the ramps of each said pair and forming with a respective side of said guide a channel for advancing elastomer.

4. In an extrusion die-throat having a composite-forming aperture with an entry for advancing parallel cords and elastomer and an exit for the composite, the improvement comprising
    a first pair of opposed aperture sidewalls converging from entry to exit;
    a second pair of opposed upper and lower aperture walls diverging from entry to exit;
    laterally spaced ramp-pairs converging upon the entry; and
    recesses between said ramp pairs forming converging channels for advancing elastomer;
    the cross-sectional area of the aperture remaining substantially constant from entry to exit.

5. In an extrusion die structure having a die-throat with a composite-forming aperture having an entry for advanging parallel cords and elastomer and an exit for the composite, the improvement comprising
    a first pair of opposed aperture sidewalls converging from entry to exit;
    a second pair of opposed upper and lower aperture walls diverging from entry to exit;
    two laterally spaced ramp-pairs converging upon the entry;
    a cord guide engaging said ramp-pairs; and
    recesses between the ramps of each said pair forming with a respective side of said guide a pair of converging channels for advancing elastomer;
    the cross-sectional area of the aperture remaining substantially constant throughout.

6. In an extrusion die-throat having a composite-forming aperture with an entry for advancing parallel cords and elastomer and an exit for the composite, the improvement comprising
    a first pair of opposed aperture sidewalls converging from entry to exit; and
    a second pair of opposed upper and lower aperture walls diverging from entry to exit;
    said pairs of walls forming rectangular parallelogram cross sections whose major dimensions remain in the same plane from entry to exit.

7. In an extrusion die-throat having a composite-forming aperture with an entry for advancing parallel cords and elastomer and an exit for the composite, the improvement comprising
    a first pair of opposed aperture sidewalls converging from entry to exit; and
    a second pair of opposed upper and lower aperture walls diverging from entry to exit;
    said pairs of walls forming transversely elongated cross sections whose major dimensions remain in the same plane from entry to exit.

8. An extension die-throat as in claim 1, 6 or 7 and converging channels communicating with the entry and extending substantially parallel to the advancing cords.

* * * * *